United States Patent [19]

Gross

[11] 4,192,717

[45] Mar. 11, 1980

[54] COVER FOR A NUCLEAR REACTOR PRESSURE VESSEL

[75] Inventor: Heiko Gross, Krefeld, Fed. Rep. of Germany

[73] Assignee: Siempelkamp Giesserei KG, Krefeld, Fed. Rep. of Germany

[21] Appl. No.: 790,536

[22] Filed: Apr. 25, 1977

Related U.S. Application Data

[60] Division of Ser. No. 749,757, Dec. 13, 1976, Pat. No. 4,124,447, which is a continuation-in-part of Ser. No. 638,075, Dec. 5, 1975, Pat. No. 4,057,162.

[30] Foreign Application Priority Data

Dec. 6, 1974 [DE] Fed. Rep. of Germany ....... 2457661
Oct. 28, 1975 [FR] France ..................... 75 32869

[51] Int. Cl.² ............................................. G21C 13/04
[52] U.S. Cl. ........................................ 176/87; 176/37; 220/3; 220/315
[58] Field of Search ................ 176/37, 87; 220/315, 220/3

[56] References Cited

U.S. PATENT DOCUMENTS

| | | | |
|---|---|---|---|
| 2,797,948 | 7/1957 | Tangard | 220/315 X |
| 2,835,269 | 5/1958 | Seymour | 220/315 X |
| 3,044,657 | 7/1962 | Horton | 220/3 X |
| 3,095,110 | 6/1963 | Pierce, Jr. | 176/87 X |
| 3,140,792 | 7/1964 | Harris | 176/87 X |
| 3,215,608 | 11/1965 | Guenther | 176/87 X |
| 3,437,230 | 4/1969 | Savory | 220/327 |
| 3,523,063 | 8/1970 | Zerna | 176/87 |
| 3,910,447 | 10/1975 | Bevilacqua | 220/3 |
| 3,963,565 | 6/1976 | Beine | 176/87 X |
| 4,047,632 | 9/1977 | Schilling | 220/315 X |

FOREIGN PATENT DOCUMENTS

| | | | |
|---|---|---|---|
| 2501021 | 8/1976 | Fed. Rep. of Germany | 176/87 |
| 977537 | 5/1960 | United Kingdom | 176/87 |

*Primary Examiner*—Peter A. Nelson
*Attorney, Agent, or Firm*—Karl F. Ross

[57] ABSTRACT

A pressure vessel, containment or burst shield for a nuclear reactor has a substantially circular cover surmounting the cylindrical part (shell) of the vessel and is preferably comprised of a plurality of circular or polylateral segments arranged concentrically and stressed inwardly by annular prestressing means. At least the outer polylateral segments and preferably all of the circular segments are provided on the upper surface with upwardly open circular grooves receiving the prestressing arrangement. The latter can comprise an outwardly open channel-shaped (U-section) supporting member receiving the stressing cables and means for transferring the radial stress of the annular stressing arrangement to the ring segment. The latter means may be wedges inserted between the support and a wall of the groove after the stressing arrangement has been placed under stress, e.g. by hydraulic means for spreading the annular stressing arrangement.

1 Claim, 8 Drawing Figures

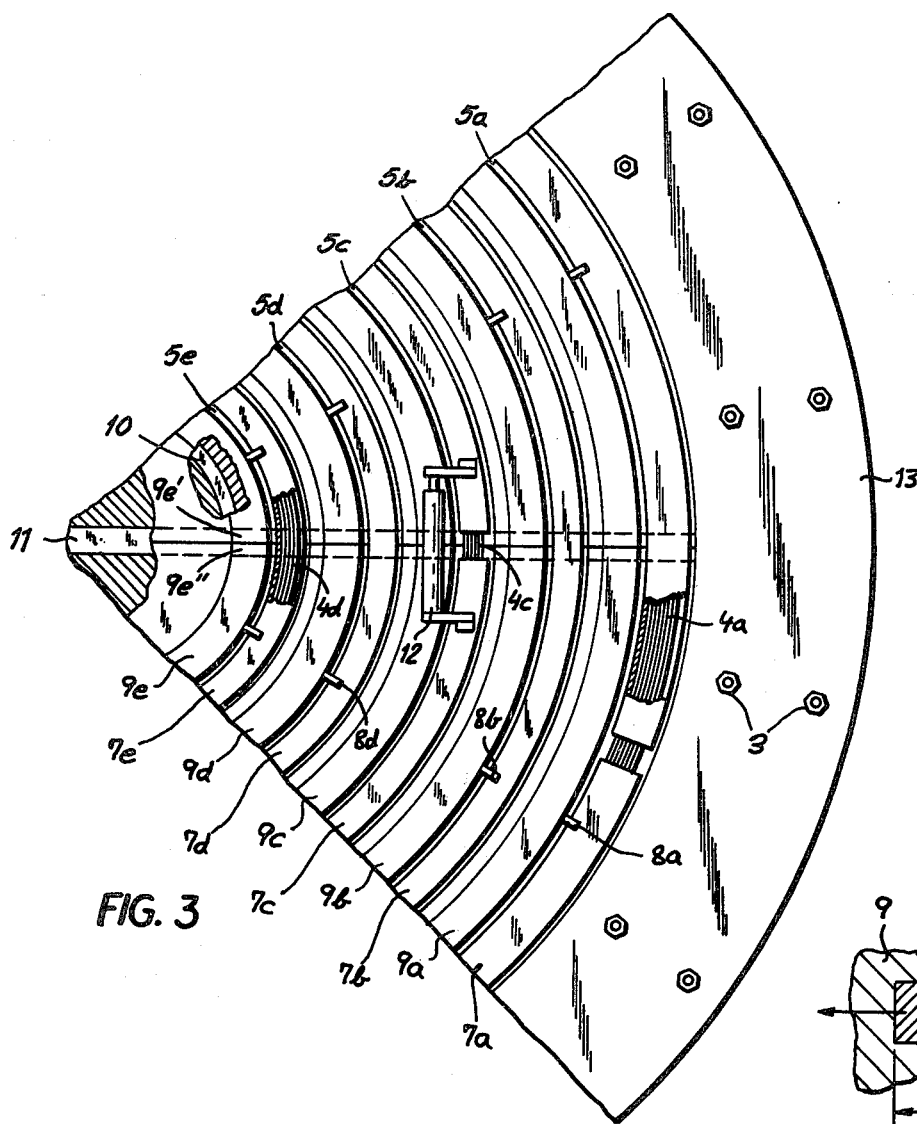
FIG. 3
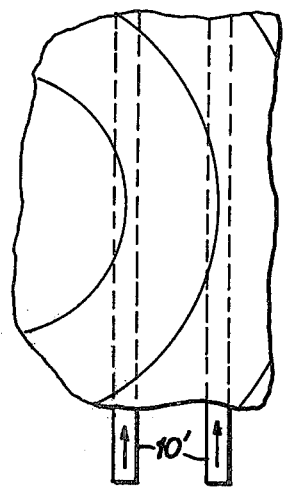
FIG. 4
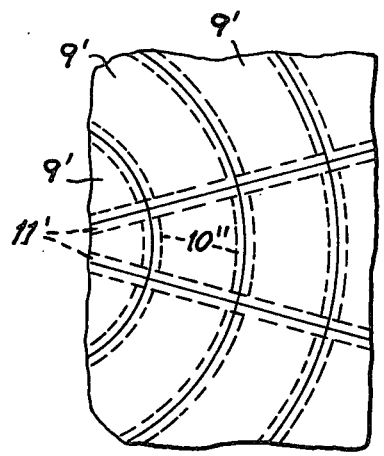
FIG. 5
FIG. 6

COVER FOR A NUCLEAR REACTOR PRESSURE VESSEL

CROSS-REFERENCE TO RELATED APPLICATIONS

This application is a division of my copending application Ser. No. 749,757 filed Dec. 13, 1976 now U.S. Pat. No. 4,124,447, as a continuation-in-part of Ser. No. 638,075 filed Dec. 5, 1975, now U.S. Pat. No. 4,057,162, and is related to the commonly as signed then-pending application Ser. No. 586,601, filed by Franz Schilling and Burkhard Beine for a "METHOD OF MOUNTING A LINER IN A BURST SHIELD OF A PRESSURIZED REACTOR" (now abandoned) and to commonly assigned copending application Ser. No. 569,157, filed Apr. 18, 1975 by Burkhard Beine and Franz Schilling entitled "BURST SHIELD CONTAINMENT FOR NUCLEAR REACTOR AND METHOD OF OPERATING SAME", now U.S. Pat. No. 4,032,397. These applications also make reference to the commonly assigned applications Ser. Nos. 441,491 and 441,492 of Feb. 11, 1974, now U.S. Pat. Nos. 3,963,565 and 3,963,563, respectively.

FIELD OF THE INVENTION

The present invention relates to a cover for a pressurizable vessel and, more particularly, to a cover for a pressure vessel for a nuclear reactor, e.g. a vessel of the type described in the aforementioned applications which may be fitted with a liner and may receive the core of a pressurized-water or other type of nuclear reactor core. Such vessels have also been termed "containments" and "burst shields" since they act to confine the products of a breakdown of the reactor or leakage therefrom.

The cover may, as described in the aforementioned applications, be assembled from circular or polylateral segments which are disposed coaxially, are composed to cast iron or other cast material of high strength, and are prestressed to resist outwardly directed forces.

Particularly, the present invention is concerned with the covers of nuclear reactors.

BACKGROUND OF THE INVENTION

In the past it has been proposed to provide the cover of a pressurizable vessel for a nuclear reactor of the type described above, which is adapted to surmount a cylindrical prestressed structure, with annular prestressing by cables extending circumferentially around the outer periphery or rim of the disk-shaped cover member. Annular prestressing in this sense denotes the application of a radially inward force upon the body of the cover as generated by a tension cable or cable assembly bearing inwardly on an annular surface of the structure.

It has been found that such prior-art cover-prestressing systems are disadvantageous in some respects, since the application of the prestress to the outer periphery of a large-diameter disk-shaped body does not provide a uniform prestressing force at interior points of the disk. It has been found to be impossible with such systems, for example, to establish a predetermined measurable inward prestress at any particular region of the cover inwardly of the periphery at which the cables acted. The application of numerically uniform or predetermined prestress forces at substantially all points or regions of the cover has been found to be particularly necessary for prestressed pressurized vessels of the pot-boiler type.

I have also found, with continuing work in systems of the type described in the copending application Ser. No. 638,075, now U.S. Pat. No. 4,057,162 that most effective force transmission in the radial and peripheral directions for ease of assembly cannot be obtained solely with circular-segmental sections of the cover. Moreover, the versatility of the cover is greatly limited if its component parts are confined to arcuate or circular segments.

OBJECTS OF THE INVENTION

It is the principal object of the present invention to provide an improved cover structure for a pressurizable vessel for a nuclear reactor whereby the disadvantages of earlier systems can be avoided.

It is also an object of the invention to provide a system whereby a predetermined prestress can be applied to substantially any region of a disk-shaped cover for a nuclear reactor vessel.

Still another object of the invention is to provide a cover for a pressurizable vessel for a nuclear reactor in which prestressing forces can be distributed more uniformly or controllably than hitherto has been the case.

Still another object of the invention is to provide a cover for a pressurizable vessel, such as a nuclear reactor, which can be assembled and fabricated more readily and which offers better force distribution than earlier systems.

Still another object of the invention is to provide a cover for a pressurizable vessel, especially a nuclear reactor containment or enclosure, which extends principles originally set forth in my above-identified application Ser. No. 638,075 now U.S. Pat. No. 4,057,162.

SUMMARY OF THE INVENTION

These objects are attained, in accordance with the present invention, with a pressurizable vessel, especially for a nuclear reactor as described in any of the aforementioned applications, which comprises a cover (preferably of circular configuration) formed along its upper portion with at least two radially spaced annular grooves or recesses receiving respective annular prestressing arrangements each including at least one cable bearing inwardly and in force-transmitting relationship with a wall of the groove to apply radially inwardly directed forces thereto.

This arrangement allows the prestressing cables to apply annular prestress uniformly concentrically over the cover and hence distributes the annular prestress thereover. The radial prestress can be set independently of the radius, i.e. the distance of the prestressing arrangement from the center, and permits the prestressing of the cover to be set at values which may be necessary to counteract the expected or predictable loading. Of course, the internal annular prestressing arrangements described above can be provided in addition to a conventional peripheral prestressing cable or arrangement as is conventional in the art.

Preferably the prestressing cable or cable for each groove are received within the channel of a U-section or channel-shaped annular supporting body received in the groove and opening outwardly, with the bight or web of that body bearing on a wall of the groove which is parallel to the axis of the cover. The supporting body and the cables together may form the annular prestressing arrangement and can be inserted together into the annular groove after having been prefabricated elsewhere. The supporting element may be spread radially by a hydraulic device to apply the desired degree of stress to the cables and the inwardly directed forces resulting from the stressing of the cables can be transmitted to the wall of the groove by force-transmitting elements, e.g. wedges, driven between the support element and the groove wall to maintain the prestress.

While the system of the present invention is suitable for use with a single-piece cover, i.e. a cover cast in a single operation, I have found it to be desirable to make the cover from a plurality of concentric ring segments, each of which is formed with at least one such groove and prestressing arrangement; the ring has adjacent segments bearing upon one another. The ring segment may be coupled together with form-fitting elements such as keys orthogonal to the axis of the pressurizable vessel.

In extending the principles set forth in application Ser. No. 638,075 now U.S. Pat. No. 4,057,162 I have discovered that it is advantageous, in conjunction with the stressing means described above, to provide the cover or circular disk with outer concentric ring segments which are urged inwardly by the prestressing means and from a number of other segments as will be described in greater detail hereinafter.

More particularly, I have found it to be highly desirable to constitute the cover of a number of central bodies of prismatic configuration and regular polygonal shape such that the polygonal bodies nest together in side to side contact with other such polygonal bodies to build up the central zone of the cover.

Outwardly of the planar array of closely fitted regular polygonal bodies, I provide an array of polygonal bodies which are not regular polygons, i.e. are not equilateral. The purpose of this second array of bodies is to nest tightly with the innermost array and yet provide walls which extend tangentially to a circle having its center coincident with the center of the cover. Outwardly of this array of blocks or elements there are provided generally wedge-shaped assemblies of blocks or elements whose surfaces either adjoin along diameters or chords of circles whose centers coincide with that of the cover. Finally, the most outwardly blocks or elements of the outer array can be circular arc segments of the type described and can be prestressed inwardly by the stressing arrangement of the present invention.

BRIEF DESCRIPTION OF THE DRAWING

The above and other objects, features and advantages of the present invention will become more readily apparent from the following description, reference being made to the accompanying drawing in which:

FIG. 3 is a plan view of the cover drawn to a smaller scale;

FIGS. 4 and 5 are fragmentary diagrammatic bottom views illustrating features of the invention;

FIG. 6 is a fragmentary sectional view illustrating one of the concepts involved in the present invention;

SPECIFIC DESCRIPTION

Figure 1:
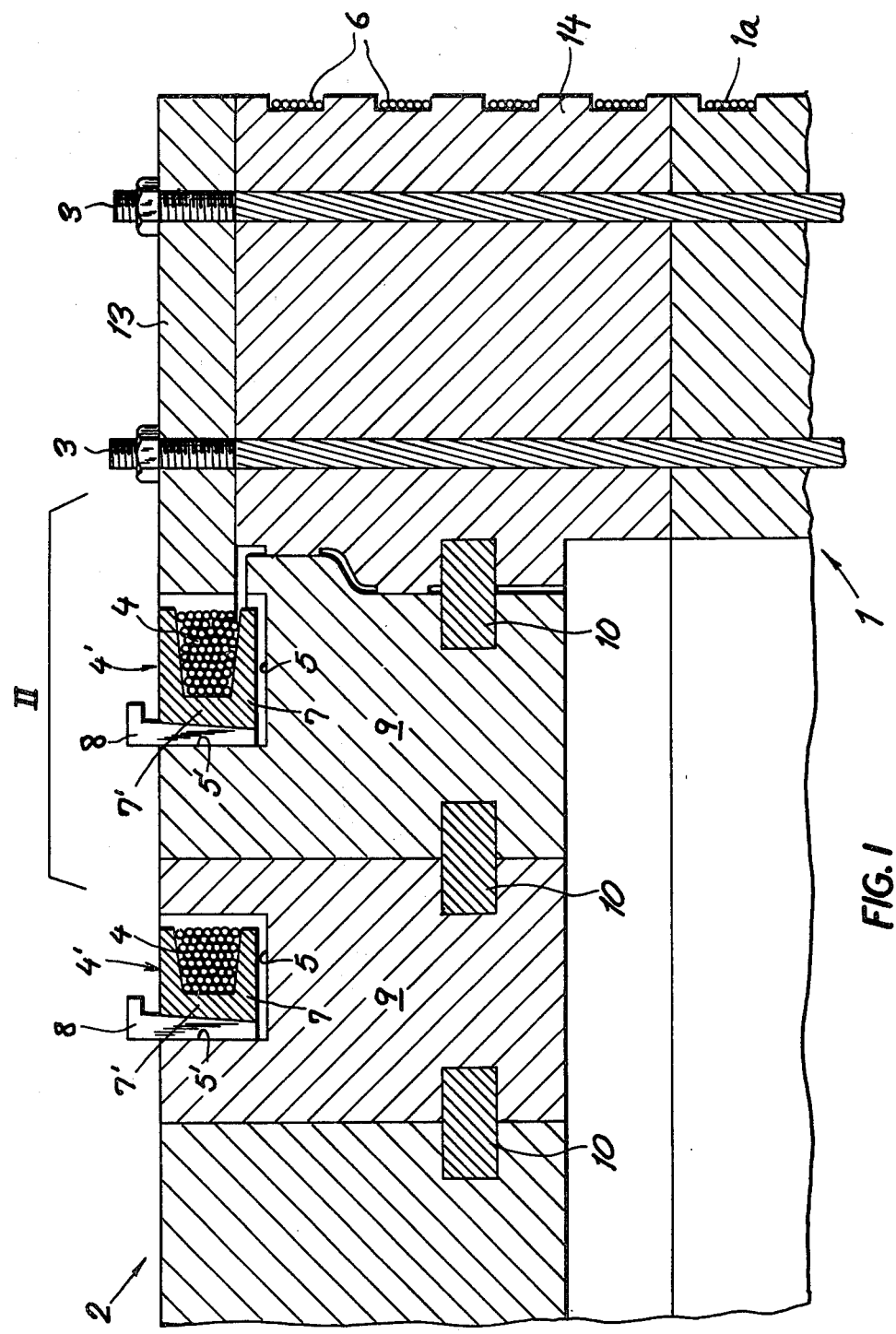
FIG. 1 is a cross-sectional view through a portion of a pressurizable vessel embodying the invention.

The overall configuration of a pressure vessel in accordance with the present invention can correspond to those of the aforementioned applications except that the cover structure thereof should correspond to that illustrated in the drawing hereof and described below.

Figure 2:
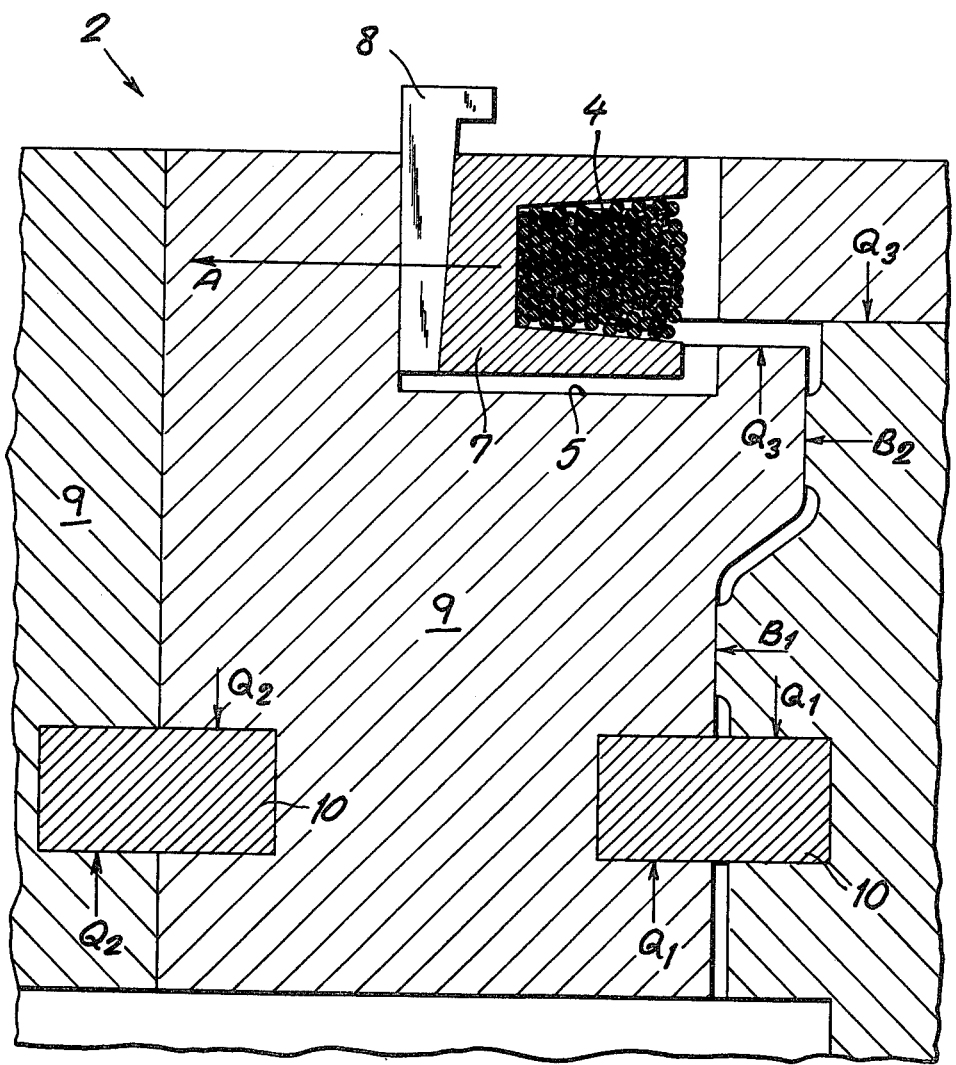
FIG. 2 is a detail view, drawn to an enlarged scale, of the portion of the cover of the vessel indicated at II in FIG. 1.

FIGS. 1 and 2 illustrate a portion of a nuclear reactor pressure vessel which comprises a cylindrical shell 1, which may be circumferentially prestressed by cables 1a, upon which is mounted the cover 2, the cover being held in place by connecting cables 3. The latter may traverse the outer member or ring segment 14 of the cover and can extend axially through the ring segments forming the cylindrical shell to apply an axial prestress to the system.

The cover 2 is prestressed by means of prestressing cables 4 in annular prestressing arrangement 4'. More specifically, the cover 2 is formed on its upper surface with two or more concentrically circular and endless annular grooves 5 having walls 5' defined by a generatrix parallel to the axis of the cylinder 1. The prestressing cables 4 of the respective prestressing assemblies 4' are received in these grooves. In addition, prestressing cables 6 may surround the periphery of the outer circular segment 14 of the cover to provide a conventional peripheral prestressing of the cover.

The cables 4 are received in U-section support elements 7 opening outwardly in the direction of the outer circumference of the cover. The support elements lie in the respective grooves 5 and force-transmitting wedges 8 are driven between the webs 7' of the support elements and the walls 5' of the grooves to maintain the inward prestress of the cables 4 after this prestressing force has been generated by hydraulic means tending to radially spread the prestressing arrangements until the wedges 8 can be inserted.

As is especially apparent from FIG. 2, which shows a detail of the cover 2, the latter comprises a plurality of ring segments 9 held together by inward prestress. Each of the ring segments 9 defines a circumferential annular groove 5 which receives the prestressing cables 4 of a respective annular prestressing arrangement 4'. The ring elements 9 are locked together against axial movement with the aid of form-fitting keys 10 extending perpendicular to the axis of the vessel 1.

As can be seen from FIG. 2 further, the cover is exposed to traverse forces Q which may be either active or redundant. Thus, if $Q_1$ is active, $Q_3$ is a redundant force.

The prestressing forces are represented at A and, where the prestressing force A is active, the radial forces $B_2$ and $B_1$ applied upon the element having the active force are redundant. It is possible, by control of the mutual engagement of the concentric elements and the prestressing force to regulate the prestressing moment and thus the forces with which one element bears upon the other in any desired relationship. Similarly force $B_2$ can be eliminated or made active; in the latter case the cables 6 generate an active prestress as well.

FIG. 3 shows at 12 a hydraulic device which can be charged with fluid to spread apart the ends of the split ring forming the support 7c for the cables 4c of the ring 9c for a cover comprising a plurality of rings 9a–9e each subdivided into ring segments 9e' and 9e'' for example. To support the two or more segments of each ring relative to one another, radial keys 11 can be introduced into confronting grooves as illustrated with the system of FIG. 2 for the circular keys 10. In addition, also as shown in FIG. 3, circular keys 10 are provided. Of course, the segments of the outer member 14 cannot be seen in FIG. 3 since they are covered by the continuous ring 13. In FIG. 3, moreover, the supports for the cables are represented at 7a–7e and the cables themselves are represented at 4a–4e. The wedges which have previously been introduced are shown at 8a, 8b, 8d and 8e, the wedges for the ring 9c having not yet been introduced.

FIG. 4 shows another possible way of keying the segments of the cover together, e.g. by the introduction of tangential keys 10' into the confronting grooves through passages formed in the rings. In the embodiment of FIG. 5, the keys which extend radially and arcuately are provided in a common plane. Thus, the radial keys 11' are continuous and extend through all of the segmented rings 9' while arc-segmental keys 10'' are provided between each segment and the neighboring segments radially inwardly and outwardly thereof.

In the embodiment of FIG. 6, the groove of the inner ring 9 has a depth S' which exceeds the width S of the split spring 10''' and the latter is pressed into the grooves when the two rings 9 are aligned and is permitted to spring into the confronting groove of the outer ring 9 in which it is lodged to a depth less than its width S.

Figure 7:
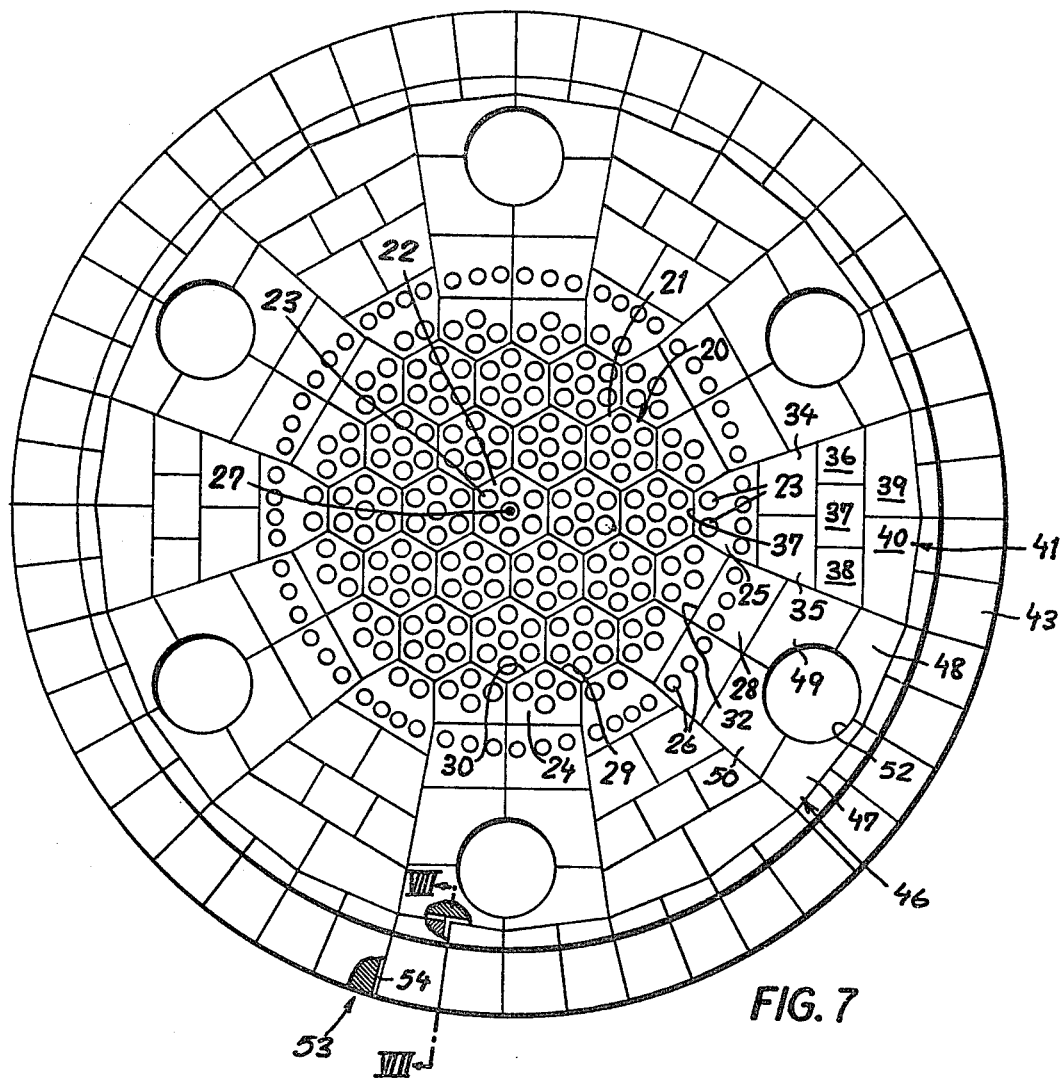
FIG. 7 is a plan view of an improved cover according to the present invention, in which the layout of the various blocks constituting the cover can be clearly seen but details of the assembly are shown only diagrammatically.
Figure 8:
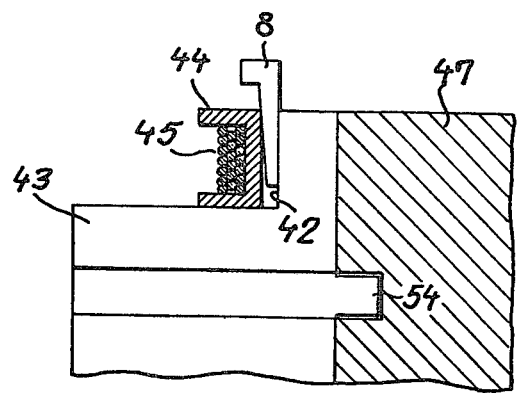
FIG. 8 is a cross section taken along the line VIII—VIII of FIG. 7.

The embodiment of FIGS. 7 and 8 provides a particularly effective assembly of elements to constitute the cover according to the invention.

According to this aspect of the invention, the cover is constituted of cast iron or cast concrete blocks having different configurations affording a particularly effective force transmission relationship for prestressing with the angular stressing arrangement described previously. The assembly comprises a planar array 20 of hexagonal blocks 21, one of which (block 22) constitutes the central block of this array. The blocks 21 and 22 are formed with throughgoing bores 23 to receive the fuel elements or modular elements of the reactor as described, for example, at pages 689 ff of the CONCISE ENCYCLOPEDIA OF NUCLEAR ENERGY, Interscience Publishing, New York, New York, 1962. The bores of course can be closed by plugs or by flanges of the tubular members fitting therethrough. The hexagonal blocks 21 are surrounded by an array of blocks 24 and 25, the latter having corresponding bores 23 and, additionally, bores 26 which form a circular array around the center 27 of the cover. These bores 26 can accommodate cooling disks, modular elements or the like.

The blocks 24 are of pentagonal plan view and serve as transition members between the hexagonal blocks of the inner array and blocks 28 of an outer array which will be described in greater detail subsequently. The blocks 24 are paired and are spaced apart by the blocks 25 which are hexagonal but not isosceles as can be seen from the drawing. The blocks 24 and 25 have inner surfaces 29 and 30 or 31 which bear against the surfaces of the regular hexagonal blocks 21, and outer surfaces 32 and 33 which lie along tangents to circles entered at 27 or constituting chords of the disk. The blocks 25 span pairs of blocks 34 and 35 which are offset from blocks 36, 37 and 38. The blocks 34 through 38 are quadrilateral in plan configuration and all, with the exception of block 37, can be trapezoidal. Block 37 is advantageously rectangular. Outwardly of the blocks 36–38 there is a pair of trapezoidal blocks 39 and 40. The blocks 25 and 34–40 form a wedge-like assembly, generally represented at 41, which is urged inwardly by the prestressing arrangement bearing against an annular abutment 42 formed by a circular array of circular-segment blocks 42. The relationship between the abutment 42, the prestressing channel 44, cables 45 and wedges 8 is shown in FIG. 8 and can correspond to that described in connection with FIG. 1.

The wedge sections 41 alternate with wedge sections 46 constituted by outer trapezoidal blocks 47, 48, inner trapezoidal blocks 49, 50 and the blocks 28 mentioned previously. The blocks 28 are formed with bores 51 lying along te circle of bores 26. For the supply of gas to the system and/or for the passage of main cooling disks into and out of the vessel, large diameter bores 52 can be provided in the wedge sections 46.

As can be seen at 53, the blocks, e.g. blocks 43, can be formed with tongues 54 engaging in grooves in adjoining blocks so that the entire assembly is held together by a tongue and groove arrangement or by the key arrangement which has previously been described. The stressing means is applied and the wedges are set also as previously set forth.

I claim:

1. A cover for a nuclear reactor pressure vessel comprising:
    a disk formed by a plurality of one-piece cast bodies in contiguous abutting relationship, said disk comprising:
    a central first array of said bodies lying in a common plane,
    a second annular array of said bodies around said central first array and coplanar therewith,
    a third annular array of said bodies around said second annular array and coplanar therewith,
    a fourth annular array of said bodies around said third annular array and coplanar therewith, said bodies of said central first array being of isosceles hexagonal configuration, said bodies of said second annular array being of pentalateral and hexalateral plan configuration, said bodies of said third annular array being of quadrilateral plan configuration and said bodies of said fourth annular array being circular arc segments, said bodies of said second, third and fourth annular arrays forming wedge-shaped sections disposed around the center of said disk,
    a circumferential abutment formed by and on said fourth annular array,
    cable means extending around said abutment and bearing inwardly thereon, and
    adjacent ones of said bodies formed with mutually interfitting means parallel to the plane of said disk for taking up forces transverse thereto.

* * * * *